May 27, 1952 R. McCULLOUGH 2,597,942
BEARING ASSEMBLY FOR DISK HARROWS
Filed Aug. 5, 1949

INVENTOR
Ray McCullough
BY Edwin D. Jones,
ATTORNEY

Patented May 27, 1952

2,597,942

UNITED STATES PATENT OFFICE 2,597,942

BEARING ASSEMBLY FOR DISK HARROWS

Ray McCullough, Fresno, Calif.

Application August 5, 1949, Serial No. 108,720

9 Claims. (Cl. 308—181)

My invention relates to harrows in which a gang of disks are rotatably mounted on a supporting axle through the medium of bearing assemblies, and it has specific reference to such assemblies. This application is a continuation in part of my application, Serial No. 27,593, filed May 17, 1948 now abandoned.

It is a purpose of my invention to provide a bearing assembly for disk harrows which is characterized by its structural simplicity, low initial cost, easy mode of assembly of its parts, long life with minimum attention, effectiveness to seal it against the admission of dust and dirt, resistance to endwise thrust set up by the lateral forces exerted by the earth on the disks, and its great strength to withstand heavy loads without failure.

I will describe only one form of bearing construction for disk harrows embodying my invention, and will then point out the novel features thereof in claims.

Figure 1:
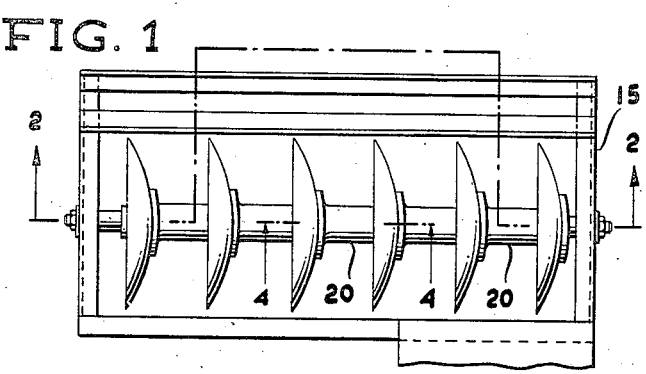
Fig. 1 is a somewhat diagrammatic plan view of a single frame of a disk harrow having incorporated therein one form of bearing assembly embodying my invention.
Figure 3:
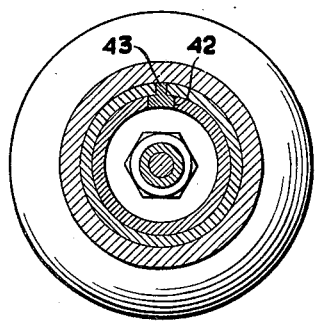
Fig. 3 is a transverse sectional view taken on the line 3—3 of Fig. 2, but on a reduced scale.

Having specific reference to the drawings, and particularly to Fig. 1, 15 indicates a frame of any suitable construction and which includes depending hangers 16 and 17 in and between which are supported a gang of concavo-convex disks 18. These disks are clamped in fixed spaced relation along a tubular shaft 19 by spools 20, all of which have confronting ends formed with annular flanges 21 and annular collars 22 between which the disks are held, that is with the exception of the right hand endmost disk which is welded, as indicated at 23, to the shaft 19.

On the left hand end of the shaft 19 is threaded a nut 24 which has an annular flange 25 with a convex face that abuts the disk 18 at the left hand end of the gang to cooperate with the adjacent flange 22 in securing that disk to the corresponding spool 20, and by proper adjustment to cause all of the sleeves to clamp the several disks in such manner as to hold the disks and spools on and for rotation with the shaft 19.

Figure 2:
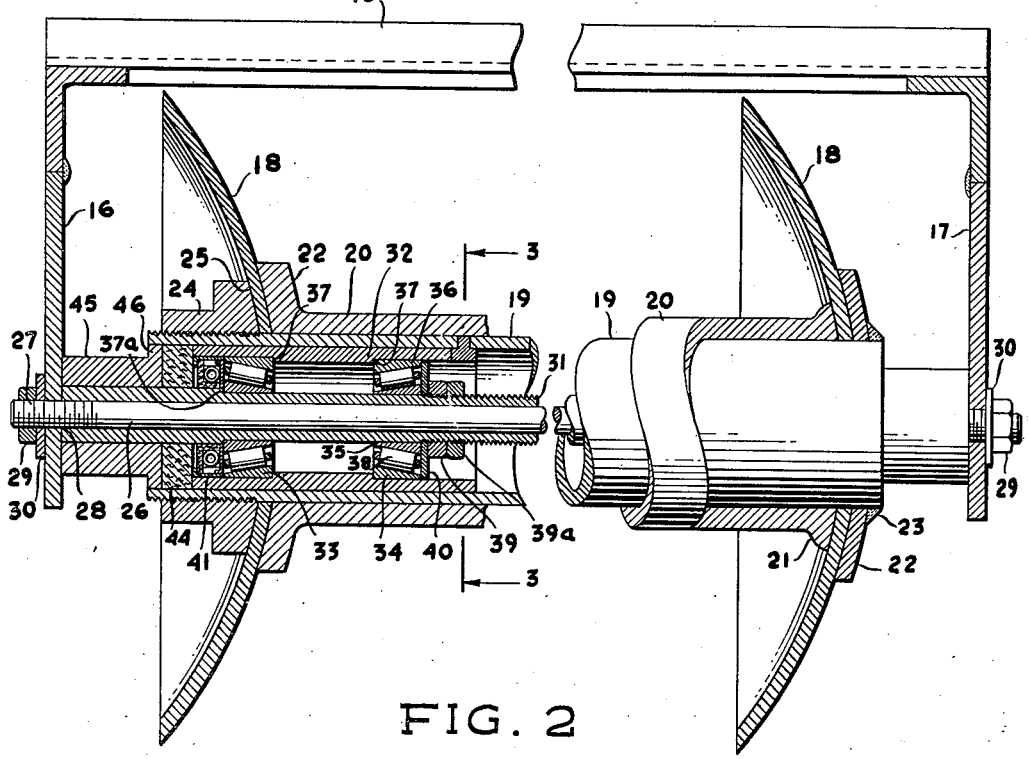
Fig. 2 is a vertical sectional view taken on the line 2—2 of Fig. 1.
Figure 4:
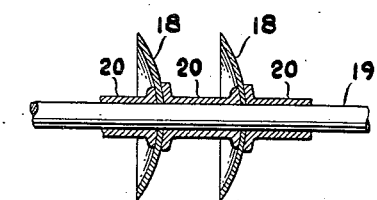
Fig. 4 is a sectional view taken on the line 4—4 of Fig. 1.

A stationary and solid axle 26 spans the hangers 16 and 17 to support the shaft 19 and the disks mounted thereon between the hangers 16 and 17. This axle 26 has screw-threaded ends 27 which extend through openings 28 in the hangers 16 and 17, so that nuts 29 may be applied to secure the axle in the hangers. Metal washers 30 are employed between the hangers and the nuts as shown in Fig. 2.

For supporting the shaft 19 for free rotation on the axle 26 two bearing assemblies are provided, and so constructed as to be readily insertable into and removable from the ends of the shaft. As the assemblies are identical in construction, only one has been shown in the drawings and a description thereof will suffice for both. Each bearing assembly comprises an inner thrust sleeve 31 of an internal diameter to receive the axle 26, and an outer bearing sleeve 32 of less length than the sleeve 31 and which has an external diameter to slidingly fit within the shaft 19. Between the sleeves 31 and 32 is an outer bearing 33 and an inner bearing 34 for rotatably supporting the outer sleeve on the inner sleeve.

These bearings are of identical construction but oppositely disposed, and each comprises an inner race 35 surrounding the sleeve 31 and an outer race 36 which is fitted in the sleeve 32 so as to abut an annular shoulder 37 on the inner side of the sleeve. The inner race 35 of the outer bearing 33 abuts on its outer side an annular shoulder 37a formed on the sleeve 31 by reducing its outside diameter at that point. Thus the inner race 35 is limited by the shoulder 37a in its movement outwardly on the sleeve 31. Between the races 35 and 36 are rollers 38 to support the outer race for rotative movement on the inner race.

The inner bearing 34 is secured in fixed position longitudinally on the thrust sleeve 31 and likewise within the bearing sleeve 32 by the provision of a nut 39 adjustable on the sleeve 31 to force a washer 40 against one side of the bearing races 35 and 36, and the outer race agaist the shoulder 37, thereby securing this bearing in fixed position between the sleeves. To prevent loosening of the nut 39 a lock nut 39a is applied to the sleeve 31, as shown.

The outer bearing 33 is held in fixed position between the sleeves 31 and 32 and against the shoulders 37 by spring gasket seal 41 tightly fitted between the sleeves and abutting the bearing.

Each bearing assembly is adapted to be inserted into the ends of the shaft 19 before the shaft is interposed between the hangers 16 and 17, and, of course, before the axle 26 is applied to the hangers. To definitely position each bearing assembly axially within the shaft 19, the inner end of the sleeve 32 is formed with one or more notches or recesses 42 in which is received one or more lugs 43 secured in the shaft 19. It will be understood that when inserting the bearing assembly into the shaft the sleeve 32 is adjusted circumferentially until the notch 42 registers with the lug 43 when the lug will pass into the notch and thus act as a stop to limit further inward movement of the sleeve 32 and, hence, the entire bearing assembly. In addition, the lug serves to secure the sleeve 32 to the shaft 19, and, thus the shaft 19, the disks 18, and the spacing spools 20 are all mounted for rotational movement on the axle 26.

Once the two bearing assemblies have been applied to the shaft ends as described, a felt sealing gasket 44 is extended around the sleeve 31 and into the shaft 19, this gasket serving to seal the bearing assembly against the entrance of dust or dirt. Following this, a thrust collar 45 is slipped onto the outer end of the sleeve 31, so that the flange 46 on the inner end of the collar is extended into the outer end of the shaft 19 to cause the collar and the flange to press against the gasket 44.

Following application of the thrust collar 45 into opposite ends of the shaft 19 the entire unit is ready for application to the frame 15. To so do the hangers 16 and 17 are positioned at the outer ends of the collars 45 so that the axle 26 can be extended through the hangers and through the sleeves 31 whereupon, the nuts 29 and washers 30 are applied. Proper adjustment of the nuts 29 inwardly on the ends of the axle 26 exerts through the hangers 16 and 17, axial pressures inwardly on the collars 45 to in turn urge the sleeves 32 inwardly and thus maintain them in engagement with the lugs 43 whereby, the bearing assemblies are held in fixed positions within the shaft to resist any axial thrust of the shaft in either direction on the axle.

A bearing assembly constructed in accordance with my invention manifestly provides a free running support on the axle 26 for the shaft and the disks carried thereby, and during actual use in the field the bearings are effectively sealed against the entrance of dust or dirt so that an initial greasing thereof lasts indefinitely. Further, the arrangement of the bearings with relation to the axle and shaft is such that the sleeves 31 and 32 are effectively held against axial thrusts which may be set up by forces exerted laterally on the disks and yet the shaft is free to rotate on the axle.

The shaft 19 and the sleeves 31 and 32 may be formed of stock tubing, while the axle 26 may be made from stock rod. Also, the bearings 33 and 34 are of conventional construction, and, hence, may be readily obtained in open markets. Since the axle is not subjected to contact with any moving parts it will not require replacement, and in the event the bearings 33 and 34 require replacement, this may be easily, quickly, and inexpensively accomplished by removing all parts of the bearing assembly as a unit from the shaft 19, and then removing those parts from the sleeves 31 and 32 necessary to gain access to the bearings.

Although I have herein shown and described only one form of bearing assembly for disk harrows embodying my invention, it is to be understood that various changes and modifications may be therein without departing from the spirit of my invention and the spirit and scope of the appended claims.

What I claim is:

1. In a disk harrow having a frame, an axle fixed to the frame, a tubular shaft adapted to carry a plurality of disks and surrounding the axle, the combination of: bearing assemblies interposed between the tubular shaft and the axle at the marginal ends of the shaft, each assembly comprising an inner sleeve fitted on the axle, an outer sleeve fitted in the shaft, and having internal and reversely disposed annular shoulders in the bore thereof, a pair of bearings between said sleeves having outer races abutting said shoulders, and means for holding said races in abutting relation to said shoulders with one of said means adjustable on the inner sleeve.

2. In a disk harrow having a frame, an axle fixed to the frame, a tubular shaft adapted to carry a plurality of disks and surrounding the axle, the combination of: bearing assemblies interposed between the tubular shaft and the axle at the marginal ends of the shaft, each assembly comprising an inner sleeve fitted on the axle, an outer sleeve fitted in the shaft, and having internal and reversely disposed annular shoulders in the bore thereof, a pair of bearings between said sleeves having outer races abutting said shoulders, and inner races surrounding the inner sleeve, a washer on the inner sleeve abutting the races of one of the bearings, a nut threaded on the inner sleeve for holding the washer against the aforesaid races and the outer race against the respective shoulder, and means within the outer sleeve for holding the outer race of the other bearing against the respective shoulder.

3. In a disk harrow having a frame, an axle fixed to the frame, a tubular shaft adapted to carry a plurality of disks and surrounding the axle, the combination of: bearing assemblies interposed between the tubular shaft and the axle at the marginal ends of the shaft, each assembly comprising an inner sleeve fitted on the axle, an outer sleeve fitted in the shaft, bearings between and spaced along the length of the sleeves, and coacting means on the outer and inner sleeves for holding said bearings in fixed spaced relation one to the other, said outer sleeve and said shaft having coacting means for limiting movement inwardly of the outer sleeve into the shaft.

4. In a disk harrow having a frame, an axle fixed to the frame, a tubular shaft adapted to carry a plurality of disks and surrounding the axle, the combination of: bearing assemblies interposed between the tubular shaft and the axle at the marginal ends of the shaft, each assembly comprising an inner sleeve fitted on the axle, an outer sleeve fitted in the shaft, bearings between and spaced along the length of the sleeves, and means for holding said bearings in fixed spaced relation one to the other, said outer sleeve having a notch in its inner end, and a lug secured to the shaft and engaging within the notch.

5. In a disk harrow having a frame, an axle fixed to the frame, a tubular shaft adapted to carry a plurality of disks and surrounding the axle, the combination of: bearing assemblies interposed between the tubular shaft and the axle at the marginal ends of the shaft, each assembly comprising an inner sleeve fitted on the axle, an outer sleeve fitted in the shaft, and having internal and reversely disposed annular shoulders in the bore thereof, a pair of bearings between said sleeves having outer races abutting said shoulders, and inner races surrounding the inner sleeve, a washer on the inner sleeve abutting the races of one of the bearings, a nut threaded on the inner sleeve for holding the washer against the aforesaid races and the outer race against the respective shoulder, and means within the outer sleeve for holding the outer race of the other bearing against the respective shoulder, said means comprising a member surrounding the inner sleeve and abutting the races at that side thereof opposite the shoulder.

6. In a harrow, the combination of a frame, a tubular shaft, a fixed shaft, disks mounted upon the tubular shaft, bearing assemblies interposed between the tubular shaft and the fixed shaft near the respective ends thereof of the fixed shaft, each assembly including an inner sleeve on the fixed shaft, an outer sleeve within the tubular shaft, bearings between the sleeves and spaced from each other, means for securing the bearings in spaced relation one to the other, means on the tubular shaft for limiting movement of the bearing assemblies inwardly of the tubular shaft, collars slidable upon the ends of the fixed axle in the tubular shaft, and means carried upon the ends of the fixed shaft for clamping the frame to the collars and securing the frame to the ends of the fixed axle, said clamping means adjustable to exert axial thrusts inwardly on the collars to hold the bearing assemblies within the tubular shaft.

7. In a disk harrow having a frame, an axle fixed to the frame, a tubular shaft adapted to carry a plurality of disks and surrounding the axle, the combination of: bearing assemblies interposed between the tubular shaft and the axle at the marginal ends of the shaft, each assembly comprising an inner sleeve fitted on the axle, an outer sleeve fitted in the shaft, and having internal and reversely disposed annular shoulders in the bore thereof, a pair of bearings between said sleeves having outer races abutting said shoulders, and inner races surrounding the inner sleeve, means adjustable on the inner sleeve for holding the outer race of one of the bearings against the respective shoulder, and means within the outer sleeve for holding the outer race of the other bearing against the respective shoulder.

8. In a disk harrow having a frame, an axle fixed to the frame, a tubular shaft adapted to carry a plurality of disks and surrounding the axle, the combination of: bearing assemblies interposed between the tubular shaft and the axle at the marginal ends of the shaft, each assembly comprising an inner sleeve fitted on the axle, an outer sleeve fitted in the shaft, and having internal and reversely disposed annular shoulders in the bore thereof, a pair of bearings between said sleeves having outer races abutting said shoulders, and inner races surrounding the inner sleeve, means adjustable on the inner sleeve for holding the outer race of one of the bearings against the respective shoulder, and means within the outer sleeve for holding the outer race of the other bearing against the respective shoulder, said means comprising a member surrounding the inner sleeve and abutting the races at that side thereof opposite the shoulder.

9. In a disk harrow having a frame, an axle fixed to the frame, a tubular shaft adapted to carry a plurality of disks and surrounding the axle, the combination of: bearing assemblies interposed between the tubular shaft and the axle at the marginal ends of the shaft, each assembly comprising an inner sleeve fitted on the axle, and having an exterior annular shoulder facing inwardly of the sleeve, an outer sleeve fitted in the shaft and having interior and reversely disposed annular shoulders in the bore thereof, inner and outer bearings between said sleeves having outer races abutting the shoulders of the outer sleeves, and inner races surrounding the inner sleeve with the inner race of the outer bearing abutting the shoulder on the inner sleeve; and means on the inner sleeve for holding the outer race of the inner bearing against the respective outer sleeve shoulder.

RAY McCULLOUGH.

REFERENCES CITED

The following references are of record in the file of this patent:

UNITED STATES PATENTS

| Number | Name | Date |
|---|---|---|
| 2,191,098 | Rapp | Feb. 20, 1940 |
| 2,262,654 | Schmeiser | Nov. 11, 1941 |